United States Patent
Lee et al.

(10) Patent No.: US 11,341,561 B1
(45) Date of Patent: *May 24, 2022

(54) SYSTEMS FOR PAYMENT CARDS WITH UPDATABLE MERCHANT DATA

(71) Applicant: Wells Fargo Bank, N.A., San Francisco, CA (US)

(72) Inventors: Jesse F. Lee, Dublin, CA (US); Jennifer A. Fisher, St. Louis, MO (US); Lynne Kenny, Walnut Creek, CA (US); Carola Neumann, San Francisco, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 81 days.

This patent is subject to a terminal disclaimer.

(21) Appl. No.: 16/715,381

(22) Filed: Dec. 16, 2019

Related U.S. Application Data

(63) Continuation of application No. 14/981,038, filed on Dec. 28, 2015, now Pat. No. 10,510,107.

(51) Int. Cl.
*G06Q 30/06* (2012.01)
*G06Q 20/36* (2012.01)
(Continued)

(52) U.S. Cl.
CPC ..... *G06Q 30/0633* (2013.01); *G06Q 20/1085* (2013.01); *G06Q 20/12* (2013.01);
(Continued)

(58) Field of Classification Search
CPC . G06Q 30/0601–0645; G06Q 30/0633; G06Q 20/1085; G06Q 20/12;
(Continued)

(56) References Cited

U.S. PATENT DOCUMENTS

| 7,155,411 B1* | 12/2006 | Blinn | ..... G06Q 20/02 705/40 |
|---|---|---|---|
| 2003/0144956 A1 | 7/2003 | Yu et al. | |

(Continued)

OTHER PUBLICATIONS

Perez, Sarah. Google Wallet Takes On Apple's Passbook With Support For Loyalty Cards, Coupons, Offers & More. Sep. 17, 2013. Published by Tech Crunch. Accessed via https://techcrunch.com/2013/09/17/google-wallet-takes-on-apples-passbook-with-support-for-loyalty-cards-coupons-offers-more/ (Year: 2013).*

(Continued)

*Primary Examiner* — Allison G Wood
(74) *Attorney, Agent, or Firm* — Foley & Lardner LLP

(57) ABSTRACT

Systems and methods for operatively coupling a payment card to a customer database are disclosed. A financial institution computing system includes a customer database, a network interface circuit enabling the financial institution computing system to exchange information over a network, and a data circuit. The customer database stores financial information and non-financial information received from at least one merchant computing system. The data circuit receives non-financial information associated with a customer from at least one merchant computing system and updates the non-financial information in the customer database. The data circuit receives a transaction request generated by the customer at a transaction terminal using a payment card corresponding to a payment card account. The data circuit transmits an approval or a denial of the transaction request and at least some of the non-financial information in the customer database to the transaction terminal to update non-financial information on the payment card.

20 Claims, 4 Drawing Sheets

(51) Int. Cl.
*G06Q 20/10* (2012.01)
*G06Q 30/02* (2012.01)
*G06Q 20/12* (2012.01)

(52) U.S. Cl.
CPC ....... *G06Q 20/363* (2013.01); *G06Q 30/0207* (2013.01); *G06Q 30/0222* (2013.01); *G06Q 30/0224* (2013.01); *G06Q 30/0601* (2013.01); *G06Q 30/0635* (2013.01)

(58) Field of Classification Search
CPC ............ G06Q 20/363; G06Q 30/0207; G06Q 30/0222; G06Q 30/0224; G06Q 30/0635
USPC ................................................ 705/26.1–27.2
See application file for complete search history.

(56) References Cited

U.S. PATENT DOCUMENTS

| | | | |
|---|---|---|---|
| 2007/0198432 A1* | 8/2007 | Pitroda | G06Q 20/327 705/64 |
| 2008/0097844 A1* | 4/2008 | Hsu | G06Q 30/0225 705/14.3 |
| 2012/0215611 A1* | 8/2012 | Korson | G06Q 30/0222 705/14.23 |
| 2012/0253914 A1* | 10/2012 | Black | G06Q 30/02 705/14.28 |
| 2013/0054396 A1 | 2/2013 | Goldfinger et al. | |

OTHER PUBLICATIONS

Welcome Real-time enables e-Couponing for JPMA's POS Software Customers—Links e-tailing and retailing for "click and mortar" merchants. Oct. 18, 2000. Business Wire. Year 2000. 3 pages.

\* cited by examiner

SYSTEMS FOR PAYMENT CARDS WITH UPDATABLE MERCHANT DATA

CROSS-REFERENCE TO RELATED PATENT APPLICATIONS

This application is a continuation application of U.S. patent application Ser. No. 14/981,038 entitled "SYSTEMS AND METHODS FOR PAYMENT CARDS WITH UPDATABLE MERCHANT DATA" filed Dec. 28, 2015, which is incorporated herein by reference in its entirety.

BACKGROUND

Many merchants of goods and/or services provide their customers with various shopping programs and offers. Merchants may maintain a loyalty program where each customer is assigned a loyalty account where customer purchases may be tracked. In return for loyalty program participation, a customer may be rewarded with discounts, "points" that may be redeemed for discounts or used as an equivalent for currency towards purchases, and so on. In addition, merchants may also provide their customers with periodic or continuing promotional offers, such as discounts for particular items, financing options, free trials, and so on. Merchants commonly provide member customers with merchant-specific cards, key fobs, and so on that contain or are associated with such non-financial, merchant-specific information. However, as a customer signs up for more loyalty programs and shops at various different merchants, the customer may become inundated with cards, key fobs, and so on.

SUMMARY

One example embodiment relates to a financial institution computing system. The financial institution computing system includes a customer database, a network interface circuit, and a data circuit. The customer database is structured to retrievably store financial information relating to at least one payment card account associated with a customer and non-financial information received from at least one merchant computing system and associated with the customer. The network interface circuit is structured to enable the financial institution computing system to exchange information over a network. The data circuit operatively couples to the customer database a payment card associated with one of the at least one payment card account. The data circuit is structured to receive non-financial information associated with the customer from at least one merchant computing system from the network and update the non-financial information in the customer database. The data circuit is further structured to receive a transaction request generated by the customer at a transaction terminal using the payment card corresponding to one of the at least one payment card account. The data circuit is structured to transmit to the transaction terminal, in response to the transaction request, one of an approval and a denial of the transaction request in addition to at least some of the non-financial information in the customer database for updating the payment card.

Another example embodiment relates to a method of operatively coupling a customer database to a payment card as performed by one or more circuits at a financial institution computing system. The method includes storing, in the customer database, financial information relating to at least one payment card account associated with a customer and non-financial information received from at least one merchant computing system and associated with the customer. The method further includes receiving, by a data circuit over a network through a network interface circuit, non-financial information associated with a customer from at least one merchant computing system and updating the non-financial information in the customer database. The method includes receiving, by the data circuit, a transaction request generated by the customer at a transaction terminal using the payment card corresponding to one of the at least one payment card account. The method further includes transmitting, by the data circuit over the network through the network interface circuit to the transaction terminal in response to the transaction request, one of an approval and a denial of the transaction request in addition to at least some of the non-financial information in the customer database for updating the payment card.

Yet another example embodiment relates to a non-transitory computer readable media having computer-executable instructions embodied therein that, when executed by a processor of a financial institution computing system, cause the financial institution computing system to perform operations to operatively couple a customer database to a payment card. The operations includes storing, in the customer database, financial information relating to at least one payment card account associated with a customer and non-financial information received from at least one merchant computing system and associated with the customer. The operations further include receiving, by a data circuit over a network through a network interface circuit, non-financial information associated with a customer from at least one merchant computing system and updating the non-financial information in the customer database. The operations include receiving, by the data circuit, a transaction request generated by the customer at a transaction terminal using the payment card corresponding to one of the at least one payment card account. The operations include transmitting, by the data circuit over the network through the network interface circuit to the transaction terminal in response to the transaction request, one of an approval and a denial of the transaction request in addition to at least some of the non-financial information in the customer database for updating the payment card.

DETAILED DESCRIPTION

Figure 1:
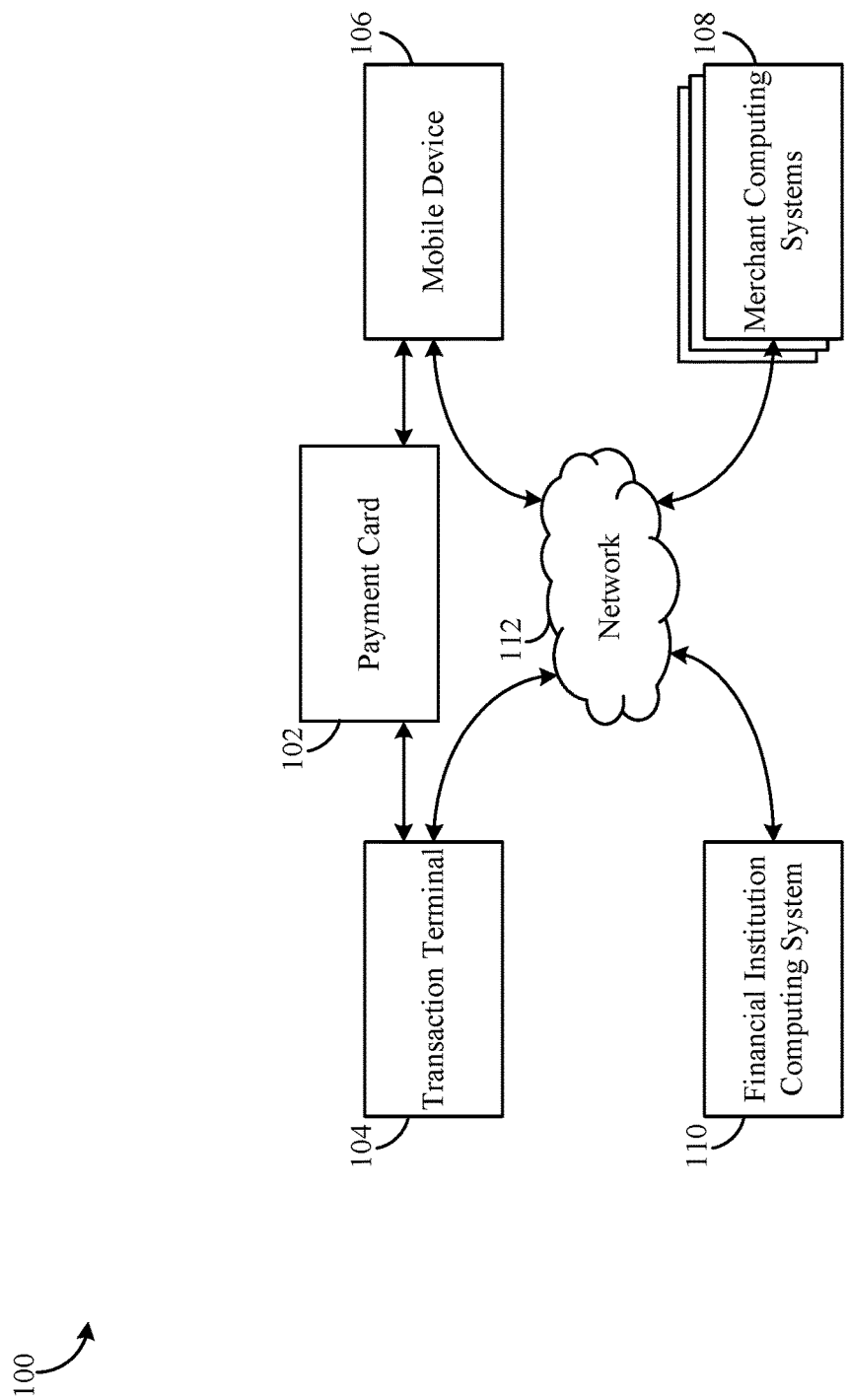
FIG. 1 is a block diagram illustrating a payment transaction system, according to an example embodiment.

Referring to FIG. 1, a system 100 includes a payment card 102, a transaction terminal 104, a mobile device 106, merchant computing systems 108, a financial institution computing system 110, and a network 112. As discussed in more detail below, in the system 100, the payment card 102 leverages the storage and processing power available at the financial institution computing system 110 in performing various exchanges of financial and non-financial data.

The network 112 communicatively interconnects one or more of the transaction terminal 104, the mobile device 106, the merchant computing systems 108, and the financial institution computing system 110. The network 112 is a data exchange medium, and may include one or more wireless networks (e.g., cellular networks, Bluetooth®, WiFi, Zigbee®, etc.), wired networks (e.g., Ethernet, DSL, cable, fiber-based, etc.), or a combination thereof. In some arrangements, the network 112 includes the internet. The network 112 allows the computing systems of the system 100 to exchange data with one another.

The payment card 102 is a physical card associated with both a customer and one or more financial accounts at a financial institution, and allows the customer to perform transactions. In various arrangements, the payment card 102 may be associated with a line of credit (e.g., a credit card), a checking account, cash advance accounts, and so on. The payment card 102 may include one or more features configured to convey account information to a merchant. For example, the payment card 102 may include a chip (e.g., as discussed with respect to FIG. 2), a magstripe, and a primary account number (a "PAN"). The PAN is an account number corresponding to a customer payment card account (e.g., a credit card, a debit card, a stored value card, etc.), and may be printed or embossed on the physical payment card 102 (e.g., along with a customer name, expiration date, security codes, etc.). The magstripe is a magnetically-responsive strip disposed on the back face of the payment card 102. The magstripe is configured to store a limited amount of information (e.g., a payment card account number, a customer name, expiration date, etc.).

The chip is a defining feature of a "smart" aspect of the payment card 102. The chip is a small circuitry system configured to exchange data with external systems (e.g., points of sale, personal computing devices, ATMs, etc.) via electrical contacts, RFID communication, NFC communication, or in another manner. Such arrangements can be found in existing payment card functions provided by, for example, Visa payWave™, Mastercard PayPass™, and American Express ExpressPay™.

The chip can be configured to be able to selectively transmit various types of information, including financial information (e.g., a PAN, an issuing entity identifier, and so on) as well as non-financial information (e.g., merchant loyalty account information, merchant promotional offers, reward point balances, etc.). In addition to data storage, the chip may be configured with limited data processing capabilities. For example, the chip may contain a data sorting or matching algorithm that allows a card reader to identify and retrieve particular types of information on the chip (e.g., non-financial information specific to a given merchant, such as a discount offered by that merchant). In some arrangements, an issuing financial institution (e.g., the financial institution associated with the financial institution computing system 110) may specifically issue the payment card 102 to include storage media (e.g., the chip and/or the magstripe) that can be updated at the transaction terminal 104 and/or the mobile device 106 (e.g., data may be added or deleted from the chip while plugged into a card reader/writer at a point of sale).

The transaction terminal 104 is a computing system configured to exchange information with the payment card 102 to complete one or more transactions. In one aspect, the transaction terminal 104 is structured to communicatively couple to the payment card 102, and then read and write information stored therein. For example, the transaction terminal 104 may retrieve financial information (e.g., a PAN) as well as non-financial information (e.g., merchant-specific loyalty membership information, any gift card or loyalty point balance information, etc.) from the payment card 102 to complete a customer purchase transaction. In another aspect, while communicatively coupled to the payment card 102, the transaction terminal 104 may write non-financial information provided by the financial institution computing system 110 to the payment card 102 (e.g., as discussed in more detail below). The transaction terminal 104 may update preexisting non-financial information (e.g., update reward point balances), add new non-financial information (e.g., new loyalty program membership information), or delete non-financial information (e.g., old or expired offers). The non-financial information written to the payment card 102 may be related to a merchant or a financial institution associated with the transaction terminal 104, or may relate to other unrelated entities (e.g., other merchants, other service providers, etc.). In some arrangements, the transaction terminal 104 is specifically structured with hardware and associated logic to both read and write data on one or more storage mediums on the payment card 102.

In one arrangement, the transaction terminal 104 is a merchant point of sale computing system associated with one or more of the merchant computing systems 108 (e.g., a computing system running a software application (an "app") configured to support the functionalities described herein). In another arrangement, the transaction terminal 104 is an automated teller machine ("ATM") associated with the financial institution computing system 110. In yet other arrangements, the transaction terminal 104 is a computing system associated with a financial institution or a merchant other than those associated with the financial institution computing system 110 and the one or more merchant computing systems 108 (e.g., a transaction terminal at a third party retailer, or another one or more of the merchant computing systems 108). Consistent across these and other arrangements, the transaction terminal 104 is configured to read and/or write data on the payment card 102.

The mobile device 106 is a computing system associated with a customer of a financial institution. The mobile device 106 is configured to execute software applications (e.g., a mobile wallet application), access websites, generate graphical user interfaces, receive various inputs, generate various outputs, and perform other similar operations. Examples of the mobile device 106 include smartphones, tablets, wearable computing devices such as eyewear and watches, and so on. In addition, in some arrangements, the mobile device 106 includes hardware and associated logics enabling data exchange processes that are compatible with the payment card 102 (e.g., similar to the transaction terminal 104).

The merchant computing systems 108 are computing systems associated with various merchants of goods or services. The merchant computing systems 108 may be configured to generate and manage any of a variety of non-financial information, such as loyalty programs, promotions, merchant credit balances (e.g., gift card or store credit amounts), customer preferences, purchase histories, and so on for a given merchant. In some arrangements, a given one of the merchant computing systems 108 is configured to exchange information with the transaction terminal 104 (e.g., to complete a purchase transaction where the transaction terminal 104 is associated with the one of the merchant computing systems 108) or the financial institution computing system 110 (e.g., to provide new or updated non-financial information to be written to the payment card 102). In some arrangements, the one of the merchant computing systems 108 is locally integrated with the transaction terminal 104 (e.g., via a local network, or as part of the same computing system). In other arrangements, the one of the merchant computing systems 108 is a remote computing system that is communicatively coupled to the transaction terminal 104 via the network 112.

In some arrangements, the transaction terminal 104 is embodied as a local computing system running one or more software applications ("apps"). For example, in various such arrangements, the transaction terminal 104 may be structured as a touchscreen tablet with a card reader/writer coupled thereto. In some arrangements, the financial institution associated with the financial institution computing system 110 may make a transaction software app available for download and installation on the transaction terminal 104 (e.g., via an app store, a financial institution website, etc.). In other arrangements, the financial institution may issue tablets that are pre-configured with transaction-enabling apps and hardware directly to one or more merchants. The transaction software app may include logic enabling hardware at the transaction terminal 104 to read and write data on the payment card 102 (e.g., a card reader/writer). The transaction software app may also enable the financial institution computing system 110 to communicate directly with the transaction terminal 104, for example to provide updated information to be written to the payment card 102 while the payment card 102 is coupled to a card reader/writer. In various such arrangements, the exchange of updated card information and the updating of the payment card 102 may occur in parallel while a transaction request is routed through conventional payment card networks (e.g., as discussed with respect to FIG. 3, below).

The financial institution computing system 110 is a computing system at a financial institution that is capable of maintaining customer accounts, processing payment transactions, and managing customer financial and non-financial information. In the context of the present disclosure, the financial institution can include commercial or private banks, credit unions, investment brokerages, and so on. The financial institution computing system 110 is operatively coupled to the payment card 102 in a way that enables customers to effectively replace a plurality of merchant loyalty cards, personal information cards (e.g., health insurance cards), gift cards, and so on with the payment card 102.

In operation, the financial institution computing system 110 is configured to receive and process non-financial information from the merchant computing systems 108, and selectively provide the non-financial information to the payment card 102. Over the course of time, the customer associated with the payment card 102 may interact with a plurality of merchants of goods and/or services. The customer may perform purchase transactions, exchanges, and returns with one or more the merchants, sign up for various customer loyalty programs, and so on. The merchant computing systems 108 associated with those merchants may maintain non-financial information relating to the customer (e.g., loyalty program membership information, promotions, credits, etc.), and forward some or all of the non-financial information to the financial institution computing system 110 over the network 112.

The financial institution computing system 110 may receive non-financial information from the merchant computing systems 108 and determine whether any of the non-financial information received should be provided to the payment card 102. To the extent that the financial institution computing system 110 determines that non-financial information should be should be added, revised, or deleted from the payment card 102, the financial institution computing system 110 may cause such actions to be performed when the payment card 102 is next communicatively coupled to the transaction terminal 104 or the mobile device 106.

Figure 2:
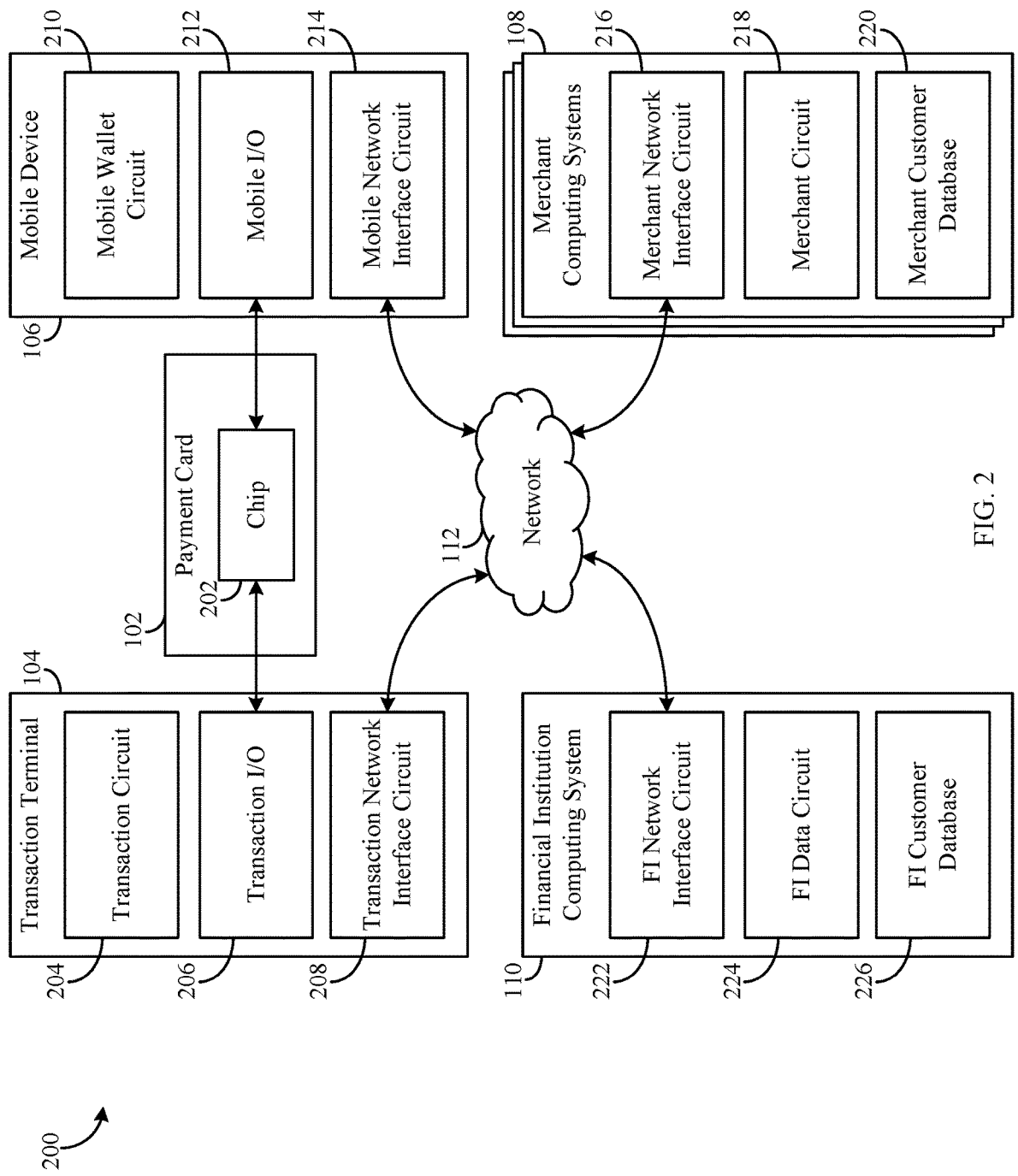
FIG. 2 is a block diagram illustrating additional features of the payment transaction system shown in FIG. 1.

Referring now to FIG. 2, a more detailed system 200 includes examples of additional features and details of the system 100 of FIG. 1. In the system 200, the payment card 102 includes a chip 202. The chip 202 is a small circuitry system configured to exchange data via electrical contacts, RFID communication, NFC communication, or in another manner. The chip 202 can be configured to be able to selectively receive and transmit various types of information, including financial information (e.g., account numbers, issuing entities, and so on) and non-financial information (e.g., customer name, loyalty information, active merchant promotions, billing address, phone number, and so on), as discussed with respect to FIG. 1, above.

For example, in some arrangements, the information stored on the chip 202 may include non-financial information for a merchant to identify relevant loyalty accounts, merchant promotion information, point balances, and so on associated with the customer. In some arrangements, merchant or financial institution loyalty programs may be implemented with loyalty account numbers that are specific to each customer, and the loyalty account numbers along with related offers, promotions, point balances, and so on may be stored on the chip 202. Loyalty account numbers may be retrieved from a card reader/writer at the transaction terminal 104 (e.g., via a transaction I/O 206, as discussed below), thereby avoiding the need for the customer to separately present a loyalty card or a phone number associated with the loyalty account at the point of sale.

Each of the transaction terminal 104, the mobile device 106, the merchant computing systems 108, and the financial institution computing system 110 includes a respective network interface circuit (i.e., the transaction network interface circuit 208, the mobile network interface circuit 214, the merchant network interface circuit 216, and the FI network interface circuit 222, respectively). Each network interface circuit enables the corresponding computing system to exchange data over the network 112.

The transaction terminal 104 further includes a transaction circuit 204 and a transaction input and output device (an "I/O") 206. The transaction I/O 206 includes hardware and associated logics configured to allow users to exchange information and interact with the transaction circuit 204. For example, an input aspect of the transaction I/O 206 can include a magstripe reader, a keyboard, a touchscreen, a microphone, a camera, a fingerprint scanner, an RFID and/or NFC reader, any user input device engageable to the transaction terminal 104 via a USB, serial cable, and so on. In turn, an output aspect of the transaction I/O 206 may include a digital display, a speaker, illuminating icons, LEDs, a cash dispenser, a paper (e.g., receipts) dispenser, and so on.

In addition, the input aspect and the output aspects of the transaction I/O 206 may include a card reader/writer. The card reader/writer provides an interface between the transaction circuit 204 and the chip 202 on the payment card 102. In various arrangements discussed herein, the card reader/writer may be specifically structured to retrieve data from the chip 202, write new or updated data onto the chip 202, and delete data from the chip 202. In some arrangements, the transaction I/O 206 may be configured to perform similar operations on other storage media on the payment card 102 as well (e.g., a magstripe).

The transaction circuit 204 is configured to complete various transactions at the transaction terminal 104, as well as update the chip 202 on the payment card 102 through the transaction I/O 206. As used herein, the term "circuit" may include hardware configured to execute the functions as described. In some embodiments, each respective "circuit"

may include software for configuring the hardware to execute the functions described herein. The circuit may be embodied as one or more circuitry components including, but not limited to, processing circuitry, storage media, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuit, hybrid circuit, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

A given "circuit" may also include one or more processors communicatively coupled to a memory. In this regard, the one or more processors may execute instructions stored in memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be configured to perform or otherwise execute independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus.

Each memory device discussed herein may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Each respective memory may be operable to maintain or otherwise store information relating to the operations performed by one or more associated circuits, including processor instructions and related data (e.g., database components, object code components, script components, etc.), in accordance with the example embodiments described herein.

Based on the operations described herein with respect to each circuit, a given circuit may further be communicatively coupled to one or more other components, for example other circuits, input devices (e.g., devices providing incoming data to be processed by the circuit), output devices (e.g., devices receiving and acting upon data processed by the circuit), or intermediary devices (e.g., routing data to or from other components). In addition, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

With respect to the transaction circuit 204, the transaction circuit 204 may be configured to receive user input from the transaction I/O 206 as to a product and/or service selected by the customer for purchase (e.g., from product packaging via a barcode scanner), as well as financial information (e.g., a payment credential) and non-financial information (e.g., loyalty account information from the chip 202 via a card reader/writer). The transaction circuit 204 may also be configured to prepare a corresponding transaction request for the purchase of the product and/or service and transmit the transaction request to the financial institution computing system 110 over the network 112 via the transaction network interface circuit 208. In addition, the transaction circuit 204 may be configured to receive an approval as well as updated non-financial information from the financial institution computing system 110 from the transaction network interface circuit 208. The transaction circuit 204 may cooperate with various features of the transaction I/O 206 to provide the customer with a receipt (e.g., a paper printer, or on a display), and update the chip 202 on the payment card 102 (e.g., via a card reader/writer).

The mobile device 106 includes a mobile wallet circuit 210 and a mobile I/O 212. Similar to the transaction I/O 206, the mobile I/O 212 may include any of several types of hardware and associated logics (e.g., displays, speakers, readers, etc.) that allow a customer to exchange information with the mobile device 106. In some arrangements, the mobile I/O 212 also includes a card reader/writer specifically structured to read and write data on the chip 202 of the payment card 102.

The mobile wallet circuit 210 may be used by a customer (e.g., a business owner or employee, a consumer, etc.) to create and interact with a mobile wallet account. While setting up a mobile wallet account, the mobile wallet circuit 210 may receive, organize, and store payment credentials from the payment card 102 and/or from a remote card network computing system (not shown). The mobile wallet circuit 210 may then manage various financial accounts corresponding to the payment credentials received. In some arrangements, the mobile wallet circuit 210 includes software issued by or on behalf of the financial institution associated with the financial institution computing system 110 (e.g., a software application, or an "app"). In other arrangements, the mobile wallet circuit includes software issued by on or on behalf of a third party wallet provider (e.g., Apple Pay™ or Samsung Pay™).

The mobile wallet circuit 210 may be configured to provide updated non-financial information to the chip 202 via the mobile I/O 212. The mobile wallet circuit 210 may initially receive payment credentials corresponding to the payment card 102 and set up a mobile wallet that manages an account for the payment card 102 on the mobile device 106. The mobile wallet circuit 210 may then receive updated non-financial information from the financial institution computing system 110 over the network 112 via the mobile network interface circuit 214. The mobile wallet circuit 210 may then update the chip 202 at the next instance where the payment card 102 is communicatively coupled to the mobile I/O 212 (e.g., plugged into a mobile card reader/writer).

The mobile wallet circuit 210 may also be configured to provide the customer with information and/or alerts relating to non-financial information from the financial institution computing system 110. For example, the financial institution computing system 110 may provide the mobile wallet circuit 210 with a promotional discount coupon with a defined expiration date over the network 112. The mobile wallet circuit 210 may be configured to cooperate with the mobile I/O 212 to periodically alert the customer as to the approaching expiration date of the promotional discount coupon (e.g., a smartphone notification, a popup window, a flashing light, etc.). In addition, the mobile wallet circuit 210 may also be configured to alert the customer when updated non-financial information is available to be placed on the chip 202.

In some arrangements, the mobile wallet circuit 210 is further configured to allow a customer to view some or all of the non-financial information stored on the chip 202 and at the financial institution computing system 110. Further, the mobile wallet circuit 210 may allow the customer to manage available non-financial information. For example, the mobile wallet circuit 210 may provide a graphical user interface for the customer on the mobile I/O 212. The graphical user interface may allow the customer to view available non-financial information, and designate non-financial information to be deleted from or added to the chip 202 (e.g., from the financial institution computing system 110). The mobile wallet circuit 210 may transmit the customer inputs to the financial institution computing system 110, and the FI data circuit 224 may act on the customer inputs. For example, the FI data circuit 224 may cause the transaction terminal 104 to update the chip 202 in accordance with the customer inputs during the next transaction.

Each of the merchant computing systems 108 includes a merchant circuit 218 and a merchant customer database 220. The merchant customer database 220 is configured to retrievably store customer information relating to various operations discussed herein, and may include non-transient data storage mediums (e.g., local disc or flash-based hard drives, local network servers, and the like) or remote data storage facilities (e.g., cloud servers). The merchant customer database 220 may store information relating to a plurality of customers of the merchant associated with the respective one of the merchant computing systems 108. Information in the merchant customer database 220 may include non-financial information such as personal information (e.g., names, addresses, phone numbers, etc.), loyalty account information (e.g., loyalty account numbers and associated customer names, point balances, etc.), promotional information (e.g., discount offerings, expiration dates, active offers, redeemed offers, etc.) and so on.

The merchant circuit 218 may be configured to support the transaction requests generated at the transaction terminal 104, provide updated non-financial information to the financial institution computing system 110, and manage non-financial information in the merchant customer database 220. The merchant circuit 218 may receive data from the transaction terminal regarding customer purchases and update non-financial information in the merchant customer database 220 such as loyalty account and/or discount information (e.g., designate a coupon as redeemed and increase a loyalty program point balance). The merchant circuit 218 may also identify non-information in the merchant customer database 220 to be provided to the chip 202 (e.g., information that would otherwise be provided via a physical card, a fob, a coupon, an email, etc.), and transmit identified non-financial information to the financial institution computing system 110 over the network 112 via the merchant network interface circuit 216.

The financial institution computing system 110 includes a financial institution ("FI") data circuit 224 and an FI customer database 226. Similar to the merchant customer database 220, the FI customer database 226 may include local and/or remote storage devices housing information to be used at least in the manner discussed herein. The FI customer database 226 may include financial information (e.g., account numbers, account balances, available credit, credit history, transaction histories, and so on), non-financial information generated by the financial institution (e.g., financial institution customer names, addresses, phone numbers, and so on), and non-financial information received from the merchant computing systems 108 over the network 112 (e.g., merchant loyalty account information, promotional information, etc.).

The FI data circuit 224 is configured to route non-financial information received from the merchant computing systems 108 to the transaction terminal 104 and/or the mobile device 106 for updating the chip 202 on the payment card 102. In one arrangement, the FI data circuit 224 is configured to collect and route non-financial information received from the merchant computing systems 108 on a continuous basis (e.g., continuously as received, periodically, in batches, etc.) to update the chip 202.

In another arrangement, the FI data circuit 224 is also configured to collect, store in the FI customer database 226, and manage information received from the merchant computing systems 108. Over the course of time, the FI data circuit 224 may receive non-financial information from the merchant computing systems 108 as a given customer of the financial institution visits or interacts with a corresponding plurality of merchants, and store the non-financial information in the FI customer database 226. The non-financial information received may include new product or discount promotions, promotion expiration dates, transaction frequencies (e.g., how often a loyalty account is used), and so on. Non-financial information provided by the merchant computing systems 108 may become more or less relevant over time (e.g., discounts may expire, new discounts may come in, the customer may shop at one merchant very frequently while rarely shopping at others, etc.). The FI data circuit 224 may be configured to sort the non-financial information in the FI customer database 226 and transmit non-financial information for updating the chip 202 based on relevance (e.g., unexpired merchant offers, frequently used loyalty accounts, etc.). For example, where the storage space on the chip 202 is limited, the FI data circuit 224 may be configured to identify and transmit information relating to the top five active loyalty accounts (e.g., account numbers) and active promotions offered by the merchants corresponding to the top five active loyalty accounts.

Further, the FI data circuit 224 may be configured to supplement the available information on the chip 202 over the course of a transaction. For example, the customer may interact with a transaction terminal 104 associated with an infrequently visited merchant to create a transaction request (e.g., for a purchase of services) involving the payment card 102. In this example, the one of the merchant computing systems 108 associated with the infrequently visited merchant previously provided an applicable discount offer to the financial institution computing system 110, however the FI data circuit 224 did not transmit the discount offer to the chip 202 (e.g., due to infrequent transactions with that particular merchant). As such, the transaction request may not include or reflect the discount offer. However, in response to receiving the transaction request, the FI data circuit 224 may search the FI customer database 226 for the merchant and the customer identified in the transaction request and locate and apply the discount offer. The FI data circuit 224 may then transmit a transaction approval indicating the use of the discount offer back to the transaction terminal 104. Alternatively, the FI data circuit 224 may transmit the discount offer to the transaction terminal 104 to apprise the customer of the discount offer, and request a customer approval to use the discount offer on the transaction request. If the customer approves the use of the discount offer, the transaction terminal 104 may update the transaction request and transmit the updated transaction request back to the financial institution computing system 110. As such, in some arrangements, the financial institution computing system 110 allows for the full scope of information provided by various merchant computing systems 108 to be available to the customer via the payment card 102 despite limited storage on the chip 202.

In operation, the financial institution computing system 110 may selectively route non-financial information received from the merchant computing systems 108 to the chip 202 on the payment card 102. The merchant circuit 218 at one of the merchant computing systems 108 may transmit non-financial information relating to a merchant customer, for example a loyalty account number, to the financial institution computing system 110 over the network 112 via the merchant network interface circuit 216. The FI data circuit 224 may receive the loyalty account number from the network 112 via the FI network interface circuit 222, and store the loyalty account number in the FI customer database 226.

In one arrangement, the FI data circuit 224 transmits the loyalty account number to the mobile device 106 over the network 112 via the FI network interface circuit 222. A customer then communicatively couples the chip 202 of the payment card 102 to the mobile I/O 212 of the mobile device 106 (e.g., plugs the payment card 102 into an attached card reader/writer, for example a microUSB attachment). The mobile wallet circuit 210 may then identify the payment card 102 (e.g., by retrieving a PAN from the chip 202), and then write the loyalty account number to the chip 202 via the mobile I/O 212. The mobile wallet circuit 210 may also delete, revise, or add other information provided by the FI data circuit 224 as well (e.g., information provided by other merchant computing systems 108 to the financial institution computing system 110). In the next subsequent transaction with the merchant associated with the loyalty account number, the customer may use the chip 202 on the payment card 102 to provide both payment credentials and the loyalty account number to complete one or more transactions.

In another arrangement, the customer identifies a product for purchase at a merchant brick and mortar location, and communicatively couples the payment card 102 to the transaction I/O 206 at the transaction terminal 104 (e.g., coupling the chip 202 to a card reader/writer) to create a transaction request. The transaction circuit 204 determines a purchase price for the product, retrieves a payment credential from the chip 202 via the transaction I/O 206, and transmits a corresponding transaction request to the financial institution computing system 110 over the network 112 via the transaction network interface circuit 208. The FI data circuit 224 at the financial institution computing system 110 receives the transaction request via the FI network interface circuit 222, and identifies the customer (e.g., by looking up the payment credential in the FI customer database 226). The FI data circuit 224 also retrieves the loyalty account number from the FI customer database 226, authorizes the transaction request (e.g., determines that a corresponding charge account contains sufficient funds for the requested transaction), and transmits a corresponding approval as well as the loyalty account number back to the transaction terminal 104 over the network 112. The transaction circuit 204 at the transaction terminal 104 receives the approval and the loyalty account number via the transaction network interface circuit 208. The transaction circuit 204 may write the loyalty account number to the chip 202 while the chip 202 is communicatively coupled to the transaction I/O 206. In addition, the transaction circuit 204 may use the loyalty account number to complete the approved transaction (e.g., by transmitting transaction information and the loyalty account number to the merchant computing systems 108 for recordkeeping).

Figure 3:
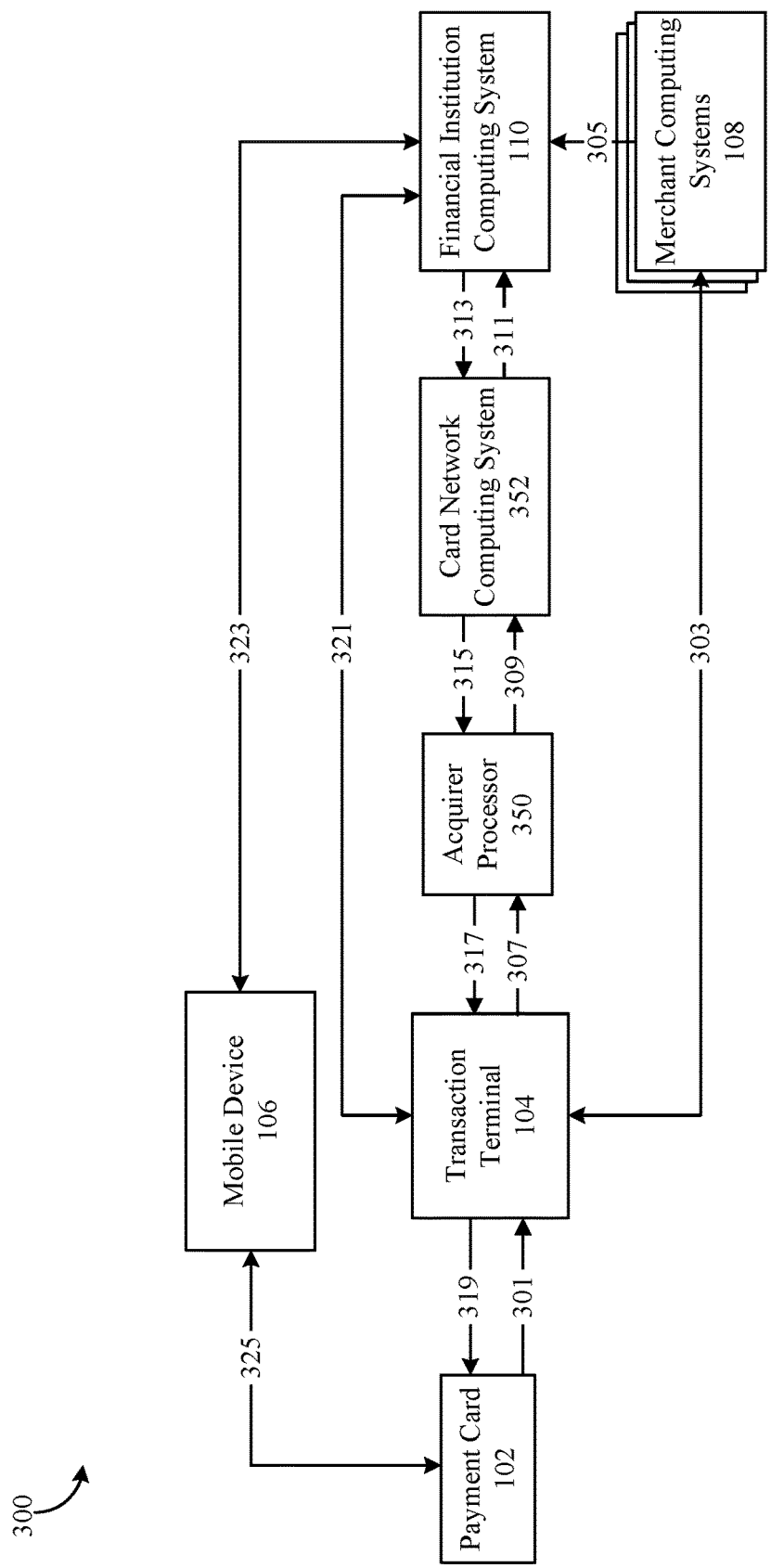
FIG. 3 is a block flow diagram of various processes involving data flows to and from a payment card.

FIG. 3 illustrates processes 300 that may be implemented by the systems of FIGS. 1 and 2. By way of example, FIG. 3 shows example data flows that result in a payment card 102 that in operation leverages the processing and storage capabilities at the financial institution computing system 110.

In one example of the processes 300, a customer may use the payment card 102 to transact with a merchant. The customer may be located at a brick and mortar location of the merchant and may wish to pay for a good or service. At step 301, the payment card 102 may transmit a payment credential (e.g., a PAN, or a tokenized version of the PAN) and non-financial information (e.g., loyalty program membership information and a discount coupon) to the transaction terminal 104 to initiate a payment transaction.

After initiating the payment transaction at 301, the transaction terminal 104 sends the transaction to an acquirer processor computing system 350 for processing at 307. Next, at step 309, the acquirer processor computing system 350 sends the transaction to a card network computing system 352 for processing a payment. At step 311, the card network computing system 352 sends the transaction to the financial institution computing system 110. The financial institution computing 110 then processes the transaction, for example, by approving the transaction based on the account status of the customer (e.g., by confirming that the customer has not exceeded the credit limit of a credit card associated with the PAN). The financial institution computing system 110 also determines whether any information on the payment card 102 should be added, deleted, or updated (e.g., information relating to the merchant and the transaction, or regardless of the merchant and the transaction). The financial institution computing system 110 may then send an approval to the transaction terminal 104 along with any changes to the data on the payment card 102 (e.g., in a user discretionary field) via the card network computing system 352 and the acquirer processor 350 (steps 313-317). A payment to the merchant may then be made, and the transaction terminal updates the data on the payment card 102 at 319.

In another example of the processes 300, the transaction terminal 104 is associated with one of the merchant computing systems 108 (e.g., where both the transaction terminal 104 and the one of the merchant computing systems 108 are operated by the same merchant). In such an arrangement, the transaction terminal 104 may retrieve non-financial information from the payment card 102 at 301 (e.g., loyalty information and a discount coupon), and transmit the non-financial information directly to one of the merchant computing systems 108 at 303 (e.g., over the network 112). The one of the merchant computing systems 108 may update its records with respect to the customer purchase and the redemption of a discount coupon. The one of the merchant computing systems 108 may also generate a new discount offer and forward the new discount offer to the financial institution computing system 110 at 305. In some arrangements, 303 and 305 may occur in parallel with some or all of the steps of the purchase transaction flow (i.e., 307, 309, 311, 313, 315, and 317). In one such an arrangement, the financial institution computing system 110 transmits the new discount offer downstream along with a transaction approval at 313-317 (e.g., in a user discretionary field). At 319, the transaction terminal 104 may delete the redeemed discount offer from the payment card 102, and write the new discount offer to the payment card 102.

In some arrangements, the transaction terminal 104 is an ATM associated with the financial institution computing system 110. In such arrangements, the financial institution computing system 110 may exchange information with the transaction terminal 104 at 321 (e.g., bypassing 307-317) to update the payment card 102 at 319. The merchant computing systems 108 may independently provide the financial institution computing system 110 with new or different customer information over time at 305. When the customer provides the ATM (i.e., the transaction terminal 104) with payment card 102 information at 301, the ATM may communicate with the financial institution computing system 110 at 321 to determine if any changes should be made to the payment card 102, in addition to completing one or more ATM transactions.

In other arrangements, the transaction terminal 104 is a point of sale computing system at a merchant with a software app provided by the financial institution associated with the financial institution computing system 110. In such arrangements, the software app includes logic enabling a card reader/writer to read, delete, and add data on the payment card 102. Further the software app may enable the transaction terminal 104 to exchange data with the financial institution computing system 110 (e.g., information to be updated, added, or deleted from the payment card 102) while a transaction request created with the payment card 102 is routed through conventional payment networks (e.g., 307, 309, 311, 313, 315, 317).

In yet another example of the processes 300, the payment card 102 is updated through the mobile device 106. Over time, the merchant computing systems 108 may provide the financial institution computing system 110 with non-financial information at 305. The financial institution computing system 110 may store and organize the non-financial information received at 305 (e.g., as discussed with respect to the FI data circuit 224), and transmit some or all of the non-financial information to the mobile device 106 at 323. At 325, the mobile device 106 may update the payment card 102 with the non-financial information received at 323 (e.g., when the chip 202 is communicatively coupled to the mobile I/O 212). In view of the present disclosure, other flow arrangements of the processes 300 are possible.

Figure 4:
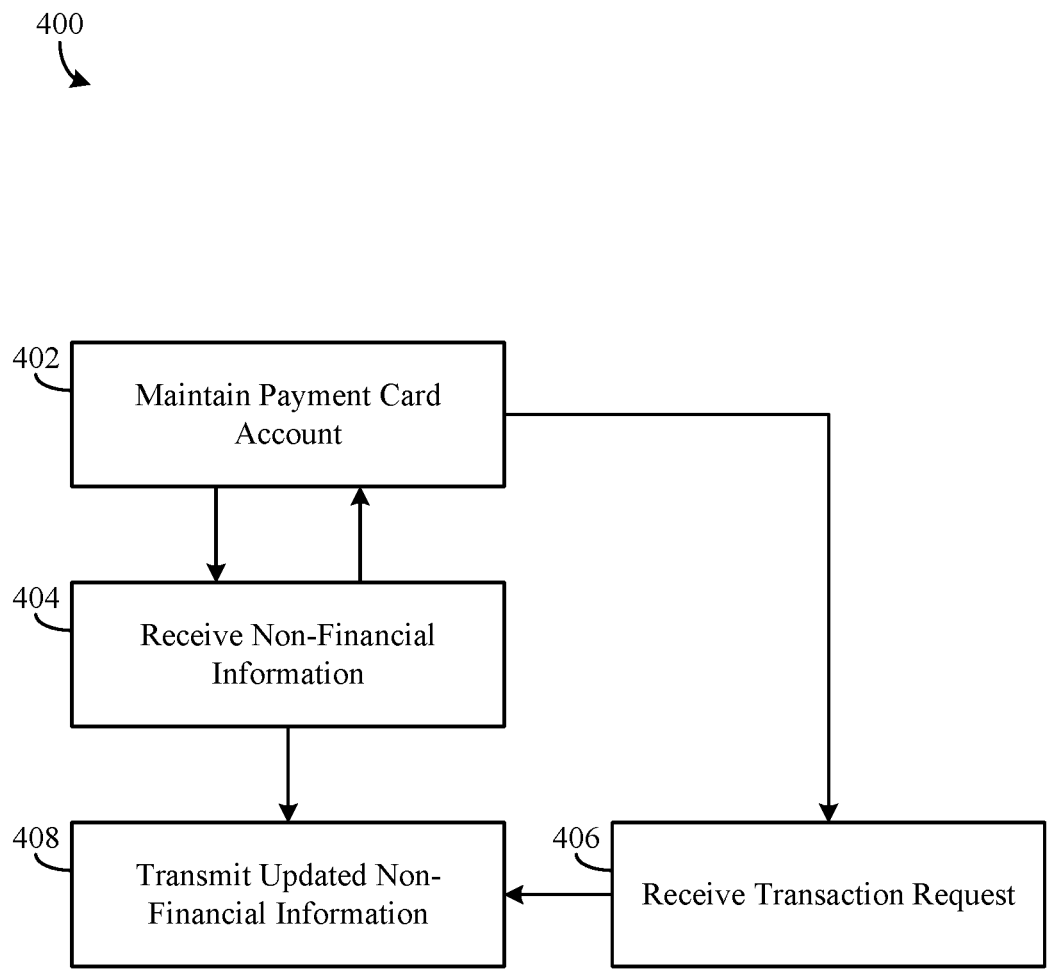
FIG. 4 is a flowchart of a method of operatively coupling a customer database to a payment card, according to an example embodiment.

Referring now to FIG. 4, a flow chart illustrating a method 400 of integrating data storage and processing capabilities of a financial institution computing system (e.g., the financial institution computing system 110) into a payment card (e.g., the payment card 102) is shown. In various embodiments, the method 400 may be performed by the financial institution computing system 110 of systems 100, 200, as discussed with respect to FIGS. 1 and 2.

At 402, a payment card account is maintained. The payment card account is a financial account maintained at a FI customer database (e.g., the FI customer database 226) at the financial institution computing system. The payment card account is associated with a payment card (e.g., a credit card, a debit card, etc.) and a customer of the financial institution. The payment card account is further associated with non-financial information provided to the financial institution computing system by a plurality of merchant computing systems (e.g., the merchant computing systems 108). In some arrangements, the payment card account is maintained by an FI data circuit (e.g., the FI data circuit 224). The FI data circuit may maintain the payment card account in a manner such that the non-financial information therein is sorted by relevance (e.g., non-expired merchant offers, frequency of loyalty account use, etc.). The FI data circuit may identify non-financial information to be provided to the payment card, along with non-financial information that should be updated or removed from the payment card.

At 404, non-financial information is received. Non-financial information may be received by the FI data circuit from a network (e.g., the network 112) via an FI network interface circuit (e.g., the FI network interface circuit 222). Any of a plurality of merchant computing systems (e.g., the merchant computing systems 108) associated with a plurality of merchants may transmit non-financial information relating to the customer associated with the payment card over the network. After the FI data circuit receives non-financial information from the network, the FI data circuit maintains the non-financial information in the FI customer database (e.g., at 402).

At 406, a transaction request is received. The transaction request is a request to transfer funds from the payment card account to a financial account associated with a merchant. In some arrangements, the transaction request also includes non-financial information. The transaction request may be received by the FI data circuit, which may identify the customer and the corresponding payment card account, and approve the transaction request (e.g., if the payment card account includes sufficient funds to cover the transaction request).

At 408, updated non-financial information is transmitted. The updated non-financial information includes non-financial information received at the financial institution computing system from a plurality of merchant computing systems. The updated non-financial information is transmitted by the FI data circuit, and in various arrangements, may be transmitted to a transaction terminal (e.g., the transaction terminal 104) and/or a mobile device (e.g., the mobile device 106). In some arrangements, the updated non-financial information is transmitted along with an approval of the transaction request received at 406. The updated non-financial information transmitted at 406 is ultimately provided to a chip (e.g., the chip 202) on the payment card while the payment card is communicatively coupled to an I/O (e.g., a card reader/writer) at either of the transaction terminal and the mobile device.

The scope of this disclosure should be determined by the claims, their legal equivalents and the fact that it fully encompasses other embodiments which may become apparent to those skilled in the art. All structural, electrical and functional equivalents to the elements of the below-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

The embodiments in the present disclosure have been described with reference to drawings. The drawings illustrate certain details of specific embodiments that implement the systems, methods and programs of the present disclosure. However, describing the embodiments with drawings should not be construed as imposing any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system.

As noted above, embodiments within the scope of the present invention include program products comprising non-transitory machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments in the present disclosure have been described in the general context of method steps which may be implemented in one embodiment by a program product including machine-executable instructions, such as program code, for example, in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments in the present disclosure may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments in the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include one or more computers including a processor, a system memory or database, and a system bus that couples various system components including the system memory to the processor. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. User interfaces, as described herein, may include a computer with a monitor, a keyboard, a keypad, a mouse, a joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure. Such variations will depend on the software and hardware systems chosen and on designer choice. It is understood that all such variations are within the scope of the disclosure. Likewise, software and web implementations of the present invention could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

Throughout the specification, numerous advantages of the exemplary embodiments have been identified. It will be understood, of course, that it is possible to employ the teachings herein without necessarily achieving the same advantages. Additionally, although many features have been described in the context of a particular data processor, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The disclosed subject matter is not limited to a particular embodiment, but extends to various modifications, combinations, and permutations that nevertheless fall within the scope and spirit of the appended claims.

What is claimed is:

1. A financial institution computing system, comprising:
    a customer database structured to retrievably store financial information relating to one or more accounts associated with a customer and non-financial information received from at least one merchant computing system and associated with the customer, the non-financial information including a first promotional offer;
    a network interface circuit structured to enable the financial institution computing system to exchange information over a network; and
    a data circuit operatively coupling to the customer database and to a payment device associated with one of the one or more accounts, wherein the payment device comprises a circuitry system and a data storage, and the data circuit is structured to:
        receive information associated with the customer from at least one merchant computing system over the network, the information including a second promotional offer, and update the non-financial information in the customer database to include the second promotional offer;
        determine to include the first promotional offer in an update for storage in the data storage of the payment device and to refrain from including the second promotional offer in the update;
        transmit the update to the payment device for storage in the data storage of the payment device;
        receive a transaction request from a transaction terminal using the payment device, the transaction request not reflecting the second promotional offer;
        determine that the second promotional offer applies to the transaction request; and
        transmit to the transaction terminal, in response to the transaction request, at least one of a transaction approval indicating that the second promotional offer was used and a request for approval of application of the second promotional offer.

2. The financial institution computing system of claim 1, wherein the data circuit is further structured to organize the first promotional offer and the second promotional offer included in the non-financial information in the customer database in a ranking of promotional offers, and wherein the data circuit is further structured to determine to refrain from including the second promotional offer in the update based on the second promotional offer not having a high enough position in the ranking.

3. The financial institution computing system of claim 1, wherein the data circuit is further structured to identify a merchant using the transaction request, and identify the non-financial information including the second promotional offer as being associated with the merchant.

4. The financial institution computing system of claim 1, wherein the data circuit is further structured to cooperate with a mobile wallet circuit to establish a mobile wallet account that includes the one or more accounts on a mobile device associated with the customer, wherein the data circuit is further structured to provide the non-financial information associated with the customer to the mobile wallet circuit over the network.

5. The financial institution computing system of claim 4, wherein the data circuit is further structured to cooperate with the mobile wallet circuit to provide the customer with an interface that allows the customer to view at least some of the non-financial information in the customer database.

6. The financial institution computing system of claim 5, wherein the data circuit is further structured to cooperate with the mobile wallet circuit to receive user inputs that include customer selections of the non-financial information for the data circuit to provide to the payment device.

7. The financial institution computing system of claim 5, wherein the data circuit is further structured to cooperate with the mobile wallet circuit to provide the customer with alerts relating to the non-financial information in the customer database.

8. The financial institution computing system of claim 7, wherein the alerts include indications of upcoming expirations of merchant offers.

9. The financial institution computing system of claim 1, wherein the transaction terminal is an automated teller machine.

10. A financial institution computing system, comprising:
    a customer database structured to retrievably store information relating to one or more accounts associated with a customer, the information including a first promotional offer and a second promotional offer;
    a network interface circuit structured to enable the financial institution computing system to exchange information over a network; and
    a data circuit operatively coupling to the customer database and a payment device associated with one of the one or more accounts, wherein the payment device comprises a circuitry system and a data storage, and the data circuit is structured to:
        determine to include one of the first promotional offer or the second promotional offer in an update for storage in the data storage of the payment device and refrain from including the other one of the first promotional offer or the second promotional offer in the update;
        transmit the update to the payment device for storage in the data storage of the payment device;
        receive a transaction request from a transaction terminal using the payment device, the transaction request not including the second promotional offer;
        determine that the second promotional offer applies to the transaction request; and
        transmit, to the transaction terminal, at least one of a transaction approval indicating that the second promotional offer was used and a request for approval to use the second promotional offer.

11. The financial institution computing system of claim 10, wherein the data circuit is further structured to cooperate with a mobile wallet circuit to establish a mobile wallet account that includes the one or more accounts on a mobile device associated with the customer, wherein the data circuit is further structured to provide the information associated with the customer to the mobile wallet circuit over the network.

12. The financial institution computing system of claim 11, wherein the data circuit is further structured to cooperate with the mobile wallet circuit to provide the customer with an interface that allows the customer to view at least some of the information in the customer database.

13. The financial institution computing system of claim 12, wherein the data circuit is further structured to cooperate with the mobile wallet circuit to receive user inputs that include customer selections of the information for the data circuit to provide to the payment device.

14. The financial institution computing system of claim 12, wherein the data circuit is further structured to cooperate with the mobile wallet circuit to provide the customer with alerts relating to the information in the customer database.

15. A transaction system, comprising:
  a transaction input/output (I/O) circuit structured to communicate with a payment device, the payment device comprising a circuitry system and a data storage;
  a transaction network interface circuit structured to enable the transaction system to exchange information with a financial institution computing system over a network, the financial institution computing system including a customer database comprising retrievably stored financial information and non-financial information relating to one or more accounts associated with a customer, the non-financial information including a first promotional offer and a second promotional offer; and
  a transaction circuit structured to:
    receive, from the financial institution computing system, an update for storage in the data storage of the payment device, the update including the first promotional offer and not including the second promotional offer;
    transmit the update to the payment device via the transaction I/O circuit;
    transmit, to the financial institution computing system, a request for a transaction at a merchant, the request not including the second promotional offer;
    receive, from the financial institution computing system based on the request, a transaction approval indicating that the second promotional offer was used or a request for approval to use the second promotional offer.

16. The transaction system of claim 15, wherein the transaction I/O circuit comprises a circuit structured to read and write data to the data storage of the payment device.

17. The transaction system of claim 15, wherein the non-financial information further includes loyalty account information and the update further includes an updated loyalty account points total, and wherein the transaction I/O circuit comprises a circuit structured to write the updated loyalty account points total to the data storage of the payment device.

18. The transaction system of claim 15, wherein the update includes deletion of a third promotional offer, and the transaction I/O circuit comprises a circuit structured to delete the third promotional offer from the data storage of the payment device.

19. The transaction system of claim 15, wherein the non-financial information further includes loyalty account information and the update further includes new loyalty program membership information, and the transaction I/O circuit comprises a circuit structured to write the new loyalty program membership information to the data storage of the payment device.

20. The transaction system of claim 15, wherein the transaction I/O circuit is structured to receive an indication of the first promotional offer stored in the data storage of the payment device, and the transaction circuit is structured to apply the first promotional offer to a transaction.

* * * * *